Sept. 5, 1950  W. A. HEIDMAN ET AL  2,521,516
AUTOMATIC LOAD RELEASING CLUTCH
FOR PARACHUTES AND THE LIKE Filed July 13, 1945  3 Sheets-Sheet 1

INVENTOR.
William A. Heidman
BY William A. Heidman Jr.
ATTORNEYS.

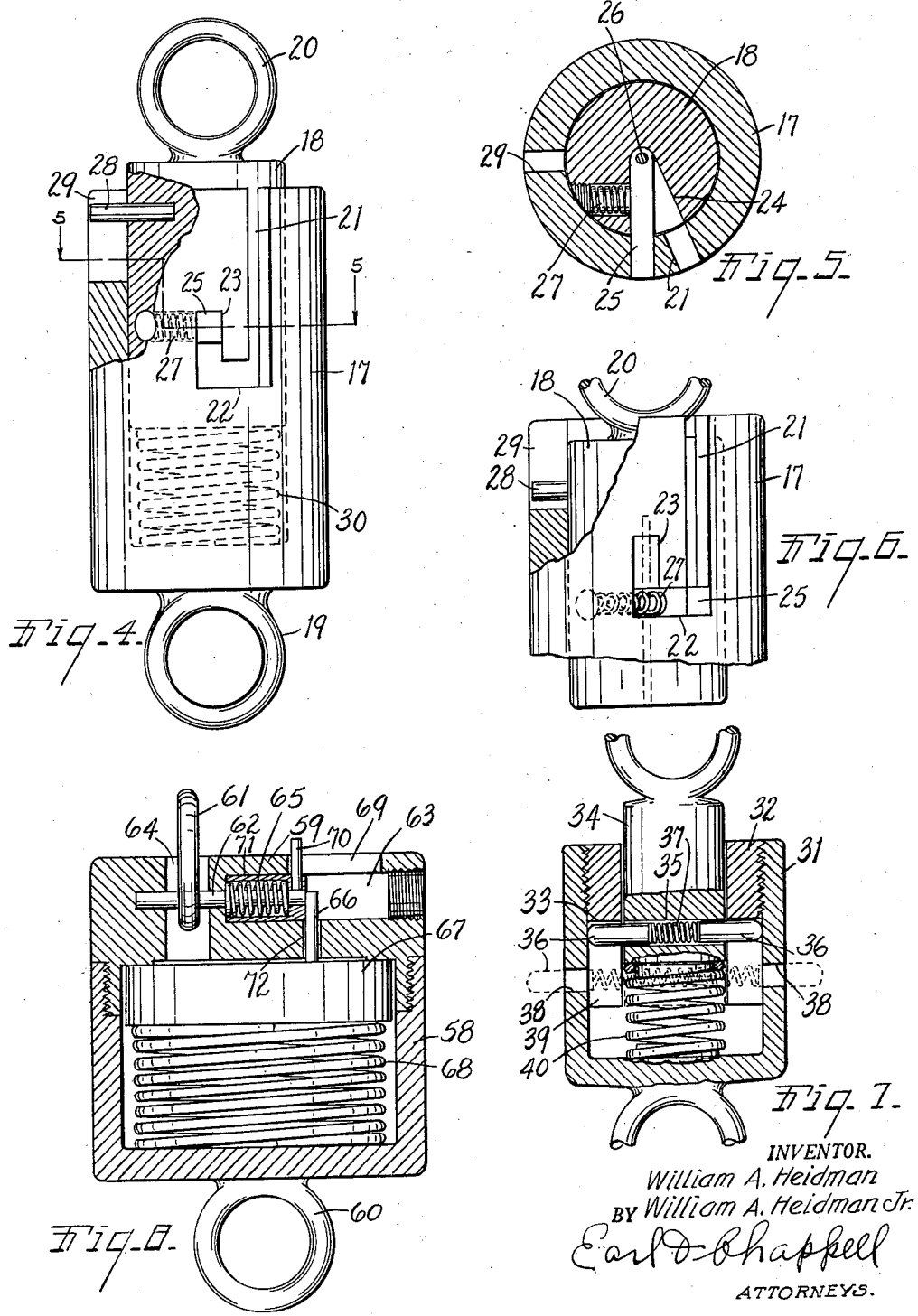

Sept. 5, 1950 W. A. HEIDMAN ET AL 2,521,516
AUTOMATIC LOAD RELEASING CLUTCH
FOR PARACHUTES AND THE LIKE
Filed July 13, 1945 3 Sheets-Sheet 3
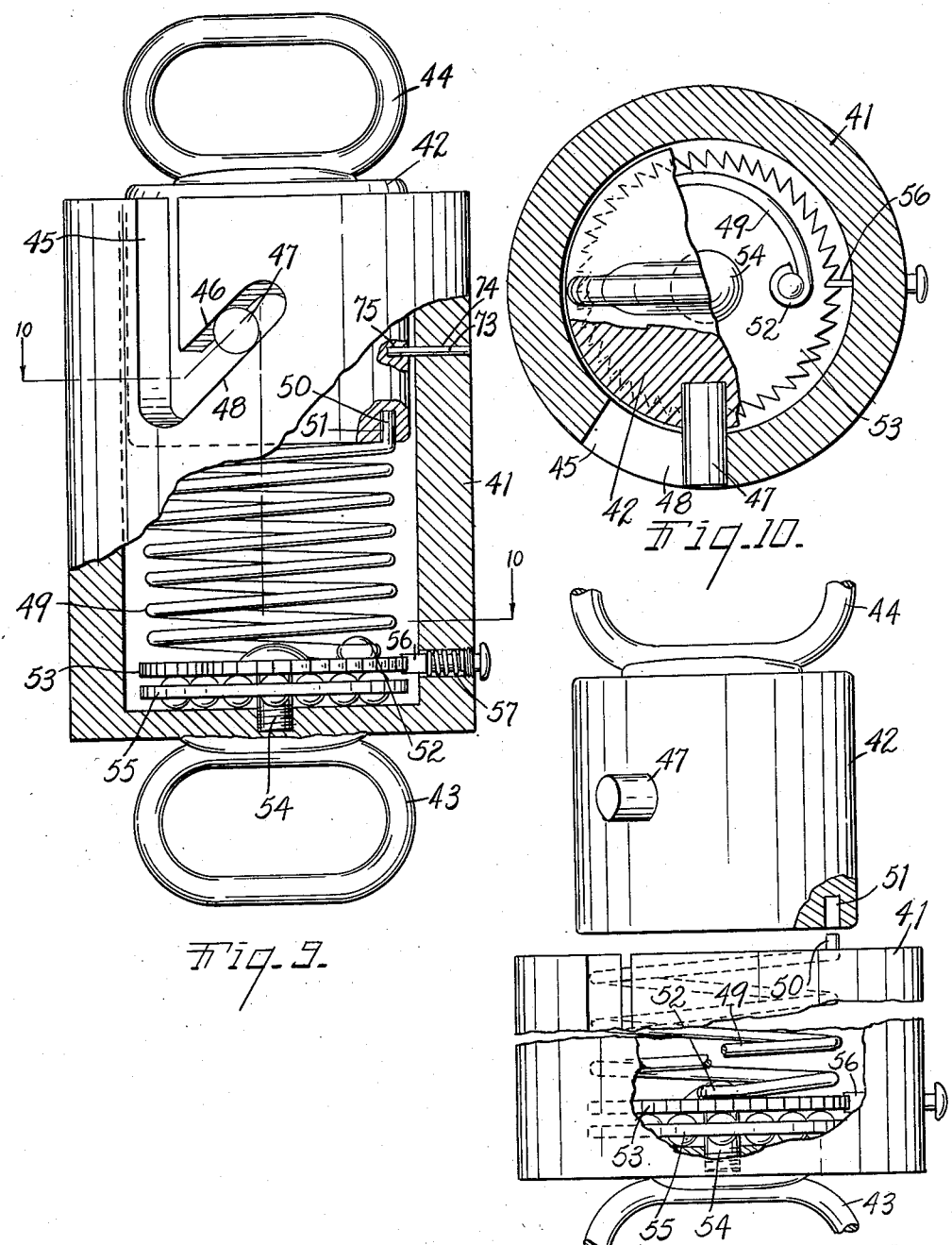
INVENTOR.
William A. Heidman
BY William A. Heidman Jr.
Earl D. Chappell
ATTORNEYS.

Patented Sept. 5, 1950

2,521,516

UNITED STATES PATENT OFFICE 2,521,516

AUTOMATIC LOAD RELEASING CLUTCH FOR PARACHUTES AND THE LIKE

William A. Heidman and William A. Heidman, Jr., Grand Rapids, Mich.

Application July 13, 1945, Serial No. 604,878

16 Claims. (Cl. 294—83)

This invention relates to improvements in automatic load releasing clutches for parachutes and the like.

The main objects of this invention are:

First, to provide an automatically releasable coupling well adapted for connecting a load to a parachute and which effectively sustains the load through varying conditions of load carrying and of shifting and changing relationship of the load relative to the parachute and vice versa and one which is not affected by sudden jerks or stresses which might occur from varying the position of the parachute resulting from air currents, air pockets, and the like but which at the same time is positively disengaged or released when the load strikes the ground.

Second, to provide an automatically releasable coupling comprising separate clutch members which are provided with manually engageable jaws, the jaws being automatically released upon impact of the coupling member such as occurs when the load strikes the ground.

Third, to provide a load releasing coupling of this type which is positive in its action so that the load is not dragged over the ground by the parachute with consequent liability of injury to the load.

Fourth, to provide a coupling having these advantages in which the clutch jaws are easily engaged in attaching the load to its support.

Objects relating to details and economies of the invention will appear from the description to follow. The invention is defined and pointed out in the claims.

Preferred embodiments of the invention are illustrated in the accompanying drawings, in which:

Fig. 2 is an enlarged fragmentary view in longitudinal section showing the jaws in disengaged position, the clutch members however being still in associated relation but free for separating movement.

Fig. 4 is a fragmentary view partially in longitudinal section of another embodiment of our invention with the clutch jaws in engaged position.

Fig. 5 is a transverse section on the broken line 5—5 of Fig. 4.

Fig. 6 is a fragmentary view partially in longitudinal section showing the jaws of the clutch members in disengaged position, the clutch members being free for longitudinal separating movement.

Fig. 7 is a fragmentary view partially in longitudinal section of another embodiment of our invention.

Fig. 8 is a view partially in longitudinal section of still another embodiment of our invention.

Fig. 9 is a fragmentary view partially in longitudinal section of a further embodiment of our invention.

Fig. 10 is a transverse section on broken line 10—10 of Fig. 9.

Fig. 11 is a fragmentary exploded view of the structure shown in Figs. 9 and 10 or a view with the clutch members in separated position.

In the accompanying drawings, no attempt has been made to show the parts in their exact proportions as that is considered as being mainly a matter of design or engineering for the particular use desired.

Figure 1:
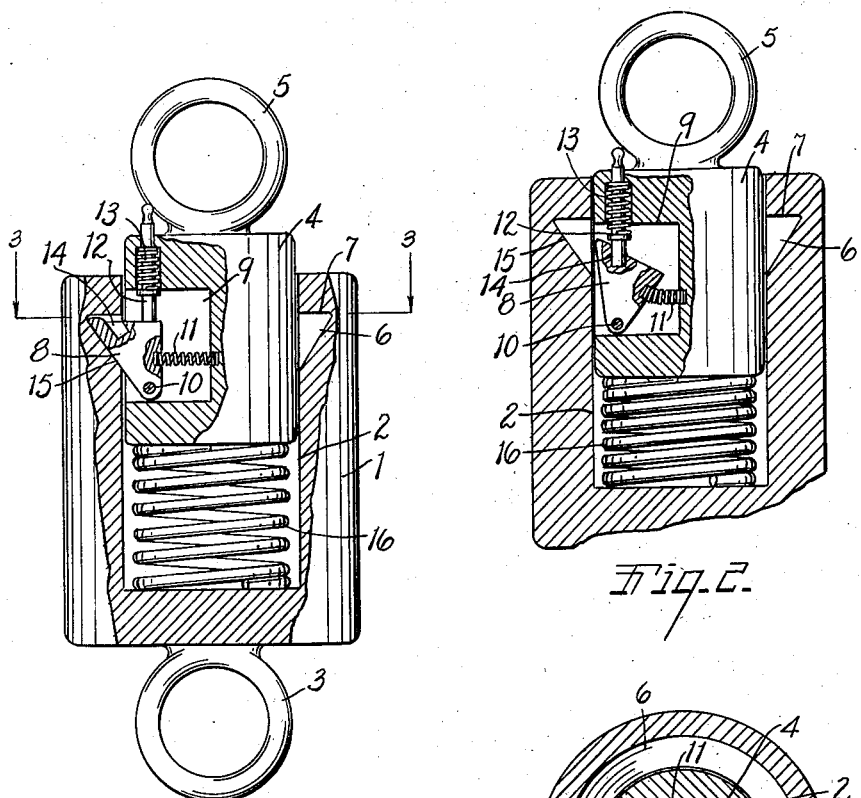
Fig. 1 is a fragmentary view partially in longitudinal section of a coupling embodying our invention with the jaws in engaged position.
Figure 3:
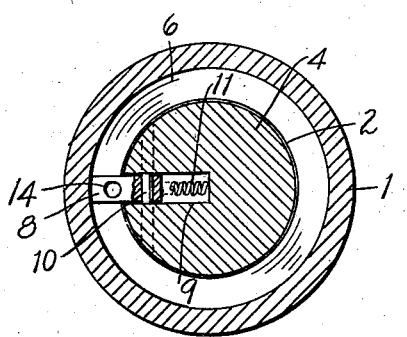
Fig. 3 is a transverse section on line 3—3 of Fig. 1.

The embodiment of our invention illustrated in Figs. 1, 2 and 3 comprises an outer clutch member 1 having a cylindrical chamber 2 therein open at the outer end of the clutch member. The member 1 is provided with an attaching ring 3 at its inner end, the inner clutch member 4 being provided with an attaching ring 5. The structure illustrated is designed for use in attaching a load to a parachute and the ring 3 is used in attaching the device to the load while the parachute is connected to the ring 5.

The member 1 is provided with an annular groove-like recess 6 adjacent its outer end, the end 7 of this groove constituting a fixed jaw member with which the pivoted jaw 8 coacts. The pivoted jaw 8 is mounted in a slot-like recess 9 in the member 4 by means of the pin 10. The spring 11 seated at one end in the bottom of the recess and at the other in a recess in the inner side of the jaw 8, acts to urge the jaw 8 outwardly. The detent 12 is urged or biased toward the jaw 8 by means of spring 13, the jaw having a recess-like keeper 14 adapted to receive the detent when the jaw is in retracted position, as shown in Fig. 2. This detent is provided with a finger piece so that the jaw may be released after the members are assembled.

The lower wall 15 of the groove 6 is preferably inclined so that it acts to swing the jaw 8 inwardly into position to be engaged by the detent as the inner clutch member is moved or telescoped inwardly as results when the coupling is subjected to a substantial impact.

The coiled spring 16 acts to urge the inner clutch member outwardly and thus urges the clutch member jaws into engaged position. However, the tension of this spring is such that it is overcome by the weight or inertia of the coupling member 4 when the coupling member 1 strikes the load or when the coupling is subjected to a substantial impact. In Fig. 2 the spring also acts to separate the clutch members after their telescoping movement resulting from the impact. After the inner clutch member 4 is outside the bore of the outer clutch member 1, that is when the clutch members 1 and 4 are completely disengaged, these members are set in their jaw engaging position as shown in Fig. 1 by manually pushing the inner member 4 into the outer member 4 against the compression of the spring 16 until the jaw 8 of inner member snaps into the recess 6 and into engagement with jaw 7 of the outer member 1. Thereafter when the coupling is subject to a substantial impact the spring 16 is further compressed by inward movement of the inner member 4, and the jaw 8 is released from the jaw 7 and locked in released position by the detent 12, as shown in Fig. 2, after which the inner clutch member may be completely withdrawn or released from the outer clutch member.

In Fig. 2, the clutch members are shown partially disengaged.

In the embodiment of our invention shown in Figs. 4, 5 and 6, the outer member 17 is chambered to slidably receive the inner member 18. These members are provided with attaching means 19 and 20, respectively. The outer member is provided with a longitudinal slot 21 having a lateral extension 22 at its inner end, the extension terminating in an offset constituting a fixed jaw 23. The inner member is provided with a segmental transverse recess 24 in which the jaw 25 is pivoted at 26 to swing transversely within the recess. The spring 27 biases the pivoted jaw towards disengaged position. The pin 28 on the inner member engages the longitudinal slot 29 in the outer member to prevent relative rotative movement of the clutch members while permitting their longitudinal or telescoping movement. The spring 30 is arranged within the outer member to support the inner member and urge the jaws into engaged position. However, the tension of this spring is such that it is overcome by the inertia or weight of the inner member when the coupling is subjected to substantial impact. This inward telescoping movement of the clutch members brings the clutch jaw 25 into alignment with the lateral extension 22 of the slot 21 permitting the spring 27 to swing the jaw into alignment with the longitudinal portion of the slot 21, as shown in Fig. 6, when the clutch members are free to separate, the rebound of the spring 30 acting to separate them.

In the embodiment of our invention shown in Fig. 7, the outer member 31 is internally threaded to receive the insert 32, the inner end of which constitutes a jaw 33. The inner clutch member 34 telescopes within the outer and is provided with a transverse bore 35 receiving the pin-like jaw members 36. A spring 37 disposed between these jaw members acts to urge them yieldingly outward and retain them in engaging relation to the fixed jaw 33. The member 31 is provided with holes 38 of such diameter as to permit the projection of the pin-like jaws 36 therethrough as shown by dotted lines in Fig. 7 when brought into alignment therewith. The member 32 is slotted at 39 to receive the jaws 36 and prevent rotative movement or to guide them into alignment with the holes 38. The spring 40 acts to hold the jaws in engaged position but is of such tension that it is overcome by the weight or inertia of the jaw member 34 when the coupling is subjected to a substantial impact, the inward movement resulting in the collapsing of the spring, bringing the jaws 36 into alignment with the holes 38 and permitting the projection of the jaws by means of the spring 37 and thus releasing the load. The rebound of the spring 40 acts to assist in the separation of the members.

In the embodiment of our invention shown in Figs. 9, 10 and 11, the outer member 41 is chambered to receive the inner member 42, these members having attaching rings 43 and 44 respectively. The outer member has a longitudinal slot 45 terminating at its inner end in an inclined extension 46 which constitutes a fixed jaw coacting with the pin-like jaw 47 on the inner member. The lower wall 48 of the slot extension 46 constitutes a cam member so that when the inner member is moved inwardly as results when the coupling is subject to a substantial impact, such impact overcoming the resistance of the spring 49, thereby bringing the jaw into alignment with the longitudinal portion of the slot and permitting the spring to aid in separating the members. The spring 49 is a combined compression and torsion spring, its outer end terminating in a lug 50 engaging a hole 51 in the inner end of the member 42. The inner end of the spring is secured at 52 to the ratchet supporting disk 53 rotatably mounted on the bolt 54 and supported by a thrust bearing designated generally by the numeral 55. The pawl 56 urged into engaging position by the spring 57 coacts with the ratchet teeth in holding the spring 49 under torsional stress.

It will be noted that the end 50 of spring 49 projects from the member 41 in its relaxed condition so that in assembling the end of the spring may be readily inserted into the hole 51 of the member 42. We preferably provide a shearing pin 73 which is disposed through the hole 74 in the member 41 to enter a hole 75 in the member 42. This shearing pin is provided to maintain the parts in assembled relation during handling. It will be noted that with the shearing pin in position, the jaw 47 does not engage the end of the jaw slot 46. However, as soon as the device is subjected to load the shearing pin is severed or broken. Shearing pins might be employed in the other embodiments to perform the same function of preventing the parts being accidentally disengaged during handling.

In the embodiment shown in Fig. 8, the chambered clutch member 58 is provided with a removable head portion 59, this being threaded into the member 58. The member 58 is provided with an attaching ring 60 while the supporting member is connected to the link 61. This link is releasably secured to the member 58 by means of the coupling pin 62 which is slidably mounted in the transverse bore 63 to project through the hole 64 in the head member 59. The spring 65 urges the coupling bolt to retracted position. The detent 66 projects into the bore 63 to support the coupling bolt in engaged position, this detent being provided with a weight 67 yieldingly supported by the spring 68. The resistance of this spring is such as to be overcome by the weight of the detent when the coupling is subjected to a substantial impact, thereby releasing the coupling pin and consequently the load.

The removable head 59 is provided with a slot 69 adapted to receive the finger piece 70 projecting from the coupling bolt, so that the coupling bolt may be conveniently retracted to permit the positioning of the link or ring 61, and so that it may be advanced against the tension of the spring to permit engaging of the bolt by the detent 66. The bolt is provided with a sleeve 71 extending over the spring and covering the hole 72 and receiving the detent 66 when the detent is in its retracted position and the detent is withdrawn by the weight. The spring 65 carries the bolt rearwardly and over the opening 72.

We have illustrated and described our invention in several embodiments as it has a wide range of adaptation. We believe, however, that the disclosures made will enable those skilled in the art to embody and adapt the invention as may be desired. We desire to be understood as claiming the same in the embodiments illustrated specifically, as well as broadly within the scope of the appended claims.

Having thus described our invention, what we claim as new and desire to secure by Letters Patent, is:

1. An automatic load release coupling of the class described comprising an outer clutch member having a chamber therein opening at its outer end and an annular internal jaw recess adjacent its upper end, the lower wall of said jaw recess being inwardly inclined, said outer clutch member being provided with an external load attaching member at its outer end, an inner clutch member loosely slidable within said outer member and having a laterally opening clutch jaw recess in the side thereof, said inner clutch member being provided with a load attaching member at its outer end, a clutch jaw pivotally mounted in said recess to swing outwardly into engagement with said jaw recess of said outer member, a spring biased detent coacting with said pivoted jaw for holding it in retracted position, said inclined wall of said jaw recess acting to swing said pivoted jaw into retracted position to be engaged by said detent as the inner member moves inwardly within the outer member, and a coiled spring arranged in said outer member to bias said inner member outwardly and urge its jaw into engagement with said jaw recess of said outer member, the weight of the inner member being such as to overcome the spring when the coupling is subjected to a substantial impact, thereby retracting the pivoted jaw and disengaging the clutch members.

2. An automatic load release coupling of the class described comprising an outer clutch member having a chamber therein opening at its outer end and an annular internal jaw recess adjacent its upper end, said outer clutch member being provided with a load attaching member at its outer end, an inner clutch member loosely slidable within said outer member and having a laterally opening clutch jaw recess in the side thereof, said inner clutch member being provided with a load attaching member at its outer end, a clutch jaw pivotally mounted in said recess in said inner member and spring biased to swing outwardly into engagement with said jaw recess of said outer member, a spring biased detent coacting with said pivoted jaw for holding it in retracted position, and a coiled spring arranged in said outer member to bias said inner member outwardly and urge its jaw into engagement with said jaw recess of said outer member, the weight of the inner member being such as to overcome the spring when the coupling is subjected to a substantial impact, thereby retracting the pivoted jaw and disengaging the clutch members.

3. An automatic load release coupling of the class described comprising an outer clutch member adapted for attachment to a load and having a chamber therein opening at its outer end and an annular internal recess adjacent its upper end, the outer end of which constitutes a fixed jaw, the lower wall of said jaw recess being inwardly inclined to provide a jaw retracting surface, an inner clutch member adapted for attachment to a load and slidable within said outer member, a clutch jaw pivotally mounted on said inner member and spring biased to swing outwardly into engagement with said jaw of said outer member, a detent coacting with said pivoted jaw for holding it in retracted position, said inclined wall of said jaw recess acting to swing said pivoted jaw into retracted position to be engaged by said detent as the inner member moves inwardly within the outer member, and a spring arranged in said outer member to bias said inner member outwardly and urge its jaw into engagement with said jaw recess of said outer member, the weight of the inner member being such as to overcome the spring when the coupling is subjected to a substantial impact, thereby retracting the pivoted jaw and disengaging the clutch members.

4. An automatic load release coupling of the class described comprising an outer clutch member adapted for attachment to a load and having a chamber therein opening at its outer end and an annular internal recess adjacent its upper end, the outer end of which constitutes a fixed jaw, an inner clutch member adapted for attachment to a load and slidable within said outer member, a clutch jaw pivotally mounted on said inner member and spring biased to swing outwardly into engagement with said jaw of said outer member, a detent coacting with said pivoted jaw for holding it in retracted position, and a spring arranged in said outer member to bias said inner member outwardly and urge its jaw into engagement with said jaw recess of said outer member, the weight of the iner member being such as to overcome the spring when the coupling is subjected to a substantial impact, thereby retracting the pivoted jaw and disengaging the clutch members.

5. An automatic load release coupling of the class described comprising an outer clutch member adapted for attachment to a load and having a chamber therein opening at its outer end and a jaw element, an inner clutch member adapted for attachment to a load and axially movable within said outer member, a spring biased jaw mounted on said inner member to coact with said jaw element of said outer member, a detent coacting with said spring biased jaw for holding it in retracted position, the wall of said outer member acting to swing said jaw into retracted position to be engaged by said detent as the inner member moves inwardly within the outer member, and a spring arranged in said outer member to bias said inner member outwardly and urge its jaw into engagement with said jaw recess of said outer member, the weight of the inner member being such as to overcome the spring when the coupling is subjected to a substantial impact, thereby retracting the pivoted jaw and disengaging the clutch members.

6. An automatic load release coupling of the class described comprising an outer clutch member adapted for attachment to a load and having a chamber therein opening at its outer end and a jaw element, an inner clutch member adapted for attachment to a load and axially movable within said outer member, a spring biased jaw mounted on said inner member to coact with said jaw element of said outer member, a detent coacting with said spring biased jaw for holding it in retracted position, said spring biased jaw being moved to retracted position to be engaged by said detent as the inner member moves inwardly within the outer member, and a spring arranged in said outer member to bias said inner member outwardly and urge its jaw into engagement with said jaw recess of said outer member, the weight of the inner member being such as to overcome the spring when the coupling is subjected to a substantial impact, thereby retracting the pivoted jaw and disengaging the clutch members.

7. An automatic load release coupling of the class described comprising an outer clutch member having a chamber therein opening at its outer end, the wall of said outer clutch member having a longitudinal slot opening at the outer end thereof, there being a lateral extension at the inner end of the slot terminating in an upward offset constituting a clutch jaw, an inner clutch member telescopingly associated with said outer member and provided with a transversely disposed segmental recess, said clutch members having pin and slot connection permitting a relative axial movement while restraining relative rotative movement thereof, a clutch jaw pivoted within said recess in said inner clutch member to swing transversely thereof and projecting therefrom to engage said slot in said outer clutch member and coacting with said jaw thereof when the clutch members are in engaged position, a spring acting to bias said pivoted jaw to releasing position when the clutch members are telescoped inwardly to disengage the clutch jaws and align the pivoted jaw with the lateral extension of said slot, and a spring arranged within said outer clutch member to bias said inner member outwardly and acting to yieldably hold said jaws in engaged position, the resistance of the spring being such that it is overcome by the weight of the inner jaw member when the coupling is subjected to substantial impact and the inner clutch member jaw is thereby brought into alignment with the lateral extension of said slot permitting the lateral swinging thereof into alignment with the longitudinal portion of the slot to permit the clutch member to separate.

8. An automatic load release coupling of the class described comprising an outer clutch member having a chamber therein opening at its outer end, the wall of said outer clutch member having a longitudinal slot opening at the outer end thereof, there being a lateral extension at the inner end of the slot terminating in an upward offset constituting a clutch jaw, an inner clutch member telescopingly associated with said outer member, said clutch members having pin and slot connection permitting a relative axial movement while restraining relative rotative movement thereof, a spring biased jaw movably mounted on said inner clutch member to swing transversely thereof and projecting therefrom to engage said slot in said outer clutch member and coacting with said jaw thereof when the clutch members are in engaged position, said spring biased jaw being actuated to releasing position when the clutch members are telescoped inwardly to disengage the clutch jaws and align the movable jaw with the lateral extension of said slot, and a spring arranged within said outer clutch member to bias said inner member outwardly and acting to yieldably hold said jaws in engaged position, the resistance of the spring being such that it is overcome by the weight of the inner jaw member when the coupling is subjected to substantial impact and the inner clutch member jaw is thereby brought into alignment with the lateral extension of said slot permitting the lateral swinging thereof into alignment with the longitudinal portion of the slot to permit the clutch members to separate.

9. An automatically releasable coupling of the class described comprising an outer clutch member having a chamber open at one end and having a longitudinal slot in its wall opening at the open end of the chamber, said slot being provided with a lateral extension terminating in a clutch jaw, an inner clutch member telescopingly but non-rotatably associated with said outer member, a manually engageable spring biased clutch jaw carried by said inner member to project into said slot of said outer clutch member and engageable against the tension of its biasing spring with said jaw of said outer member, and a spring arranged within said outer clutch member to bias said inner member outwardly and acting to yieldably hold said jaws in engaged position, the resistance of the spring being such that it is overcome by the weight of the inner clutch member when the coupling is subjected to substantial impact and the inner clutch member jaw is thereby brought into alignment with the lateral extension of said slot permitting the lateral swinging thereof into alignment with the longitudinal portion of the slot to permit the clutch members to separate.

10. An automatically releasable coupling of the class described comprising an outer clutch member having a chamber open at one end and having a slot in its wall opening at the open end of the chamber and terminating in an offset constituting a clutch jaw, an inner clutch member telescopingly but non-rotatably associated with said outer member, a manually engageable spring biased clutch jaw carried by said inner member to project into said slot of said outer clutch member and engageable against the tension of its biasing spring with said jaw of said outer member, and a spring arranged within said outer clutch member to bias said inner member outwardly and acting to yieldably hold said jaws in engaged position, the resistance of the spring being such that it is overcome by the weight of the inner clutch member when the coupling is subjected to substantial impact.

11. An automatically releasable coupling of the class described comprising an outer member having a longitudinal slot in the wall thereof terminating a laterally extending inclined jaw portion, an inner member longitudinally and rotatably movable in said outer member and provided with a pin-like jaw projecting into said slot and engageable with said jaw with a relative rotative movement of the clutch members, a combined compression and torsion spring connected at one end to said inner member and acting to urge it yieldingly outward in jaw engaging position, a rotatable tensioning support for the other end of said spring provided with a ratchet, and a pawl coacting with said ratchet for holding said spring tensioning support in its adjusted position, the compression resistance of the spring being such that it is overcome by the weight of the inner clutch member when the coupling is subjected to substantial impact and the inner clutch member rotated and its jaw brought into alignment with the longitudinal portion of said slot against the torsional resistance of said spring and the spring acts to separate the clutch members.

12. An automatically releasable coupling of the class described comprising an outer member having a longitudinal slot in the wall thereof terminating in a laterally extending inclined jaw portion, an inner member longitudinally and rotatably movable in said outer member and provided with a pin-like jaw projecting into said slot and engageable with said jaw with a relative rotative movement of the clutch members, and a combined compression and torsion spring connected at one end to said inner member and acting to urge it yieldingly outward in jaw engaging position, the compression resistance of the spring being such that it is overcome by the weight of the inner clutch member when the coupling is subjected to substantial impact and the inner clutch member rotated and its jaw brought into alignment with the longitudinal portion of said slot against the torsional resistance of said spring and the spring acts to separate the clutch members.

13. An automatically releasable coupling of the class described comprising an outer member having an inclined groove constituting a jaw, an inner member longitudinally and rotatably movable in said outer member and provided with a jaw engageable with said outer member jaw with a relatively rotatable movement of the members, a combined compression and torsion spring connected at one end to said inner member and acting to urge it yieldingly in jaw engaging position, a rotatable tensioning support for the other end of said spring provided with a ratchet, and a pawl coacting with said ratchet for holding said spring tensioning support in its adjusted position, the compression resistance of the spring being such that it is overcome by the weight of the inner clutch member when the coupling is subjected to substantial impact and the inner member jaw is thereby brought into alignment with the longitudinal portion of said slot against the torsional resistance of said spring, the spring acting to separate the members.

14. An automatically releasable coupling of the class described comprising an outer member having an inclined groove constituting a jaw, an inner member longitudinally and rotatable movable in said outer member and provided with a jaw engageable with said outer member jaw with a relatively rotatable movement of the members, and a combined compression and torsion spring connected at one end to said inner member and acting to urge it yieldingly in jaw engaging position, the compression resistance of the spring being such that it is overcome by the weight of the inner member when the coupling is subjected to substantial impact and the inner member jaw is thereby brought into alignment with the longitudinal portion of said slot against the torsional resistance of said spring, the spring acting to separate the members.

15. In an automatically releasable coupling, the combination of a pair of telescoping clutch members provided with coacting jaws, a spring acting on said clutch members to urge their jaws into engaging position, the resistance of the spring being such that it is overcome by the inertia of the clutch members when the coupling is subjected to a substantial impact and the clutch members thereby brought into position to disengage the jaws and to permit separation of the clutch members, and a shearing pin acting to hold said clutch members in assembled relation for handling, said shearing pin being fractured when the clutch members are subjected to load.

16. In an automatically releasable coupling of the class described, the combination of telescopingly associated separable clutch members, one of said clutch members being cylindrically bored and closed at one end and open at the other end, the other clutch member being slidably disposed in the open end of the first named clutch member, said clutch members being provided with coacting jaws, one jaw being associated with one telescoping clutch member and the other jaw being associated with the other telescoping clutch member, said jaws being in a position to permit relative shifting of the same from a released position to a coacting engaging position following manually relatively shifting of said telescoping clutch members from an outermost telescoping position to a predetermined position inward of such outermost position, and a spring disposed within the outer cylindrically bored clutch member between the closed end thereof and the inner end of the inner clutch member to yieldingly force said ends away from each other and being under compression when the jaws are engaged and acting to urge said clutch members into jaw engaging position, said inner clutch member being movable inwardly of the outer clutch member from said jaw engaging position, the resistance of the spring being such that it is overcome by the inertia of the clutch members and the inner clutch member is movable inwardly of the outer clutch member from said jaw engaging position when the coupling is subject to substantial impact, thereby permitting disengagement of said jaws and separation of said telescoping clutch members, one clutch member having an attaching ring independent of said jaws for connection to a load, and the other clutch member having an attaching ring independent of said jaws for connection to a supporting means.

WILLIAM A. HEIDMAN.
WILLIAM A. HEIDMAN, Jr.

REFERENCES CITED

The following references are of record in the file of this patent:

UNITED STATES PATENTS

| Number | Name | Date |
|---|---|---|
| 1,845,466 | Williams | Feb. 16, 1932 |
| 2,057,699 | Williams | Oct. 20, 1936 |
| 2,270,317 | Larson | Jan. 20, 1942 |
| 2,373,386 | De Freitas | Apr. 10, 1945 |
| 2,413,450 | Johnsen | Dec. 31, 1946 |
| 2,420,746 | Heidman et al. | May 20, 1947 |

FOREIGN PATENTS

| Number | Country | Date |
|---|---|---|
| 118,090 | Australia | Feb. 2, 1944 |